United States Patent
Solmeyer et al.

(10) Patent No.: US 12,517,191 B2
(45) Date of Patent: Jan. 6, 2026

(54) CHIP SCALE MAGNETOMETER

(71) Applicant: Honeywell International Inc., Charlotte, NC (US)

(72) Inventors: Neal Eldrich Solmeyer, Edina, MN (US); Chad Fertig, Roseville, MN (US); Argyrios Dellis, Plymouth, MN (US); Jianfeng Wu, Tucson, AZ (US)

(73) Assignee: Honeywell International Inc., Charlotte, NC (US)

( * ) Notice: Subject to any disclaimer, the term of this patent is extended or adjusted under 35 U.S.C. 154(b) by 146 days.

(21) Appl. No.: 18/591,434

(22) Filed: Feb. 29, 2024

(65) Prior Publication Data
US 2025/0277878 A1 Sep. 4, 2025

(51) Int. Cl.
*G01R 33/032* (2006.01)
*H01S 5/024* (2006.01)
*H01S 5/04* (2006.01)
*H01S 5/183* (2006.01)

(52) U.S. Cl.
CPC ........... *G01R 33/032* (2013.01); *H01S 5/024* (2013.01); *H01S 5/041* (2013.01); *H01S 5/18361* (2013.01)

(58) Field of Classification Search
CPC ....... G01R 33/032; H01S 5/024; H01S 5/041; H01S 5/18361
USPC ........................................................ 324/244.1
See application file for complete search history.

(56) References Cited

U.S. PATENT DOCUMENTS

| | | | | |
|---|---|---|---|---|
| 4,869,598 A | * | 9/1989 | McDonald | H10N 60/84 374/176 |
| 5,065,096 A | * | 11/1991 | Muck | G01R 33/0354 505/846 |
| 5,420,100 A | * | 5/1995 | Vittoria | G01R 33/0358 327/528 |
| 6,154,480 A | * | 11/2000 | Magnusson | H01S 5/18361 372/98 |
| 6,594,300 B2 | | 7/2003 | Wipiejewski | |
| 8,836,327 B2 | | 9/2014 | French et al. | |
| 9,077,149 B2 | * | 7/2015 | Margalit | H01S 5/0607 |
| 10,042,009 B2 | | 8/2018 | Lindorfer et al. | |
| 11,563,306 B2 | | 1/2023 | Moench et al. | |
| 11,733,321 B2 | | 8/2023 | Rosenfeld | |
| 12,339,338 B2 | * | 6/2025 | Solmeyer | G01R 33/345 |

(Continued)

FOREIGN PATENT DOCUMENTS

DE 102020004617 A1 1/2021
WO WO-2019018411 A1 * 1/2019 ......... H01S 5/34366

OTHER PUBLICATIONS

Zhou, Peng, et al. "Application of VCSEL in bio-sensing atomic magnetometers." Biosensors 12.12 (2022): 1098. (Year: 2022).*

(Continued)

*Primary Examiner* — Christopher P Mcandrew
(74) *Attorney, Agent, or Firm* — Fogg & Powers LLC

(57) ABSTRACT

An enclosure for housing a vertical cavity laser (VCL) includes multiple platform substrates in which one or more layers of the VCL are disposed thereon. The enclosure also includes temperature control circuitry for regulating the thermal environment of each layer independently. The temperature control circuitry can adjust the temperature of a layer based on thermal feedback. In doing so, each layer of the VCL can be thermally insulated relative to another layer.

20 Claims, 9 Drawing Sheets

(56) References Cited

U.S. PATENT DOCUMENTS

| | | | |
|---|---|---|---|
| 2004/0032647 A1* | 2/2004 | Wasserbauer | H01S 5/50 359/344 |
| 2009/0201959 A1* | 8/2009 | Stelmakh | G02B 6/1225 356/123 |
| 2019/0348813 A1* | 11/2019 | Johnson | H01S 5/18361 |
| 2020/0403378 A1 | 12/2020 | Fujii et al. | |
| 2022/0091200 A1* | 3/2022 | Gerginov | G01R 33/26 |
| 2022/0128407 A1 | 4/2022 | Lee et al. | |
| 2022/0307997 A1 | 9/2022 | Meijer et al. | |
| 2022/0397429 A1 | 12/2022 | Burchard et al. | |
| 2023/0349989 A1 | 11/2023 | Burchard et al. | |

OTHER PUBLICATIONS

Xiang, Lei, et al. "VCSEL mode and polarization control by an elliptic dielectric mode filter." Applied Optics 57.28 (2018): 8467-8471. (Year: 2018).*

* cited by examiner

CHIP SCALE MAGNETOMETER

BACKGROUND

Magnetometers are devices designed to measure magnetic fields, and are particularly useful as navigation sensors. In the aerial context, magnetometers are used by many aircraft for directional guidance when traveling to a destination. Current magnetometers utilize optical sensing techniques and comprise guided or free-space optics that are arranged in various architectures.

Although optical sensing magnetometers provide highly accurate and sensitive measurements, they also can be bulky and expensive to fabricate. Some emerging vehicles, such as unmanned underwater vehicles (UUVs) and unmanned aerial vehicles (UAVs) lack the capability to utilize many optical sensing magnetometers because they take up too much space or weight in/on the vehicle. Additionally, many optical sensing magnetometers are prone to external biases such as temperature fluctuations and vibrations. Such biases are particularly more likely to occur for vehicle navigation, where vehicles such as UUVs and UAVs routinely experience environmental changes when navigating.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, a system is disclosed. The system comprises an enclosure comprising an exterior and an interior. The interior comprises a plurality of protrusions. Each protrusion is configured to support at least one component of a vertical cavity laser (VCL) to define a layer. Each respective layer of a plurality of layers is stacked vertically with respect to another respective layer. The plurality of layers is thermally insulated from the exterior of the enclosure. One of the plurality of layers is thermally insulated with respect to another of the plurality of layers. A pump light source is disposed on a first layer of the plurality of layers. The pump light source is configured to generate light at a first frequency. A radio frequency (RF) scanner is disposed on a second layer of the plurality of layers. The RF scanner is configured to emit RF radiation at a range of frequencies to a first material. A gain medium is disposed on a third layer of the plurality of layers. The gain medium is configured to generate probe light at a second frequency in the VCL. The first material is disposed on a fourth layer of the plurality of layers. The first material configured to absorb or intensify the light at the second frequency when excited by light at the first frequency. An optical resonator comprising a plurality of reflecting elements is disposed on at least one layer of the plurality of layers. The optical resonator is configured to generate output light. The system comprises a detector coupled to the interior of the enclosure. The detector is configured to detect the output light. The system comprises temperature control circuitry electrically coupled to the plurality of layer. The temperature control circuitry is configured to adjust a temperature of one or more layers.

In another embodiment, an enclosure configured to house a vertical cavity laser (VCL) is disclosed. The enclosure comprises an exterior; and an interior. The interior comprises a plurality of protrusions. Each protrusion is configured to support at least one component of the VCL to define a layer. Each respective layer of a plurality of layers is stacked vertically with respect to another respective layer. The plurality of layers is thermally insulated from the exterior of the enclosure. One of the plurality of layers is thermally insulated with respect to another of the plurality of layers. A pump light source is disposed on a first layer of the plurality of layers. The pump light source is configured to generate light at a first frequency. A radio frequency (RF) scanner is disposed on a second layer of the plurality of layers. The RF scanner is configured to emit RF radiation at a range of frequencies to a first material. A gain medium is disposed on a third layer of the plurality of layers. The gain medium is configured to generate probe light at a second frequency in the VCL. The first material is disposed on a fourth layer of the plurality of layers. The first material is configured to absorb or intensify the light at the second frequency when excited by light at the first frequency. An optical resonator comprising a plurality of reflecting elements is disposed on at least one layer of the plurality of layers. The optical resonator is configured to generate output light. The enclosure comprises a detector coupled to the interior of the enclosure. The detector is configured to detect the output light. The enclosure comprises temperature control circuitry electrically coupled to the plurality of layers. The temperature control circuitry is configured to adjust a temperature of one or more layers.

In yet another embodiment, a method for fabricating a magnetometer is disclosed. The magnetometer comprises an enclosure comprising an exterior and an interior. The interior comprises a plurality of protrusions. Each protrusion is configured to support at least one component of a vertical cavity laser (VCL) to define a layer. The method comprises disposing a pump light source on a first layer of the plurality of layers. The pump light source is configured to generate light at a first frequency. The method comprises disposing a radio frequency (RF) scanner on a second layer of the plurality of layers. The RF scanner is configured to emit RF radiation at a range of frequencies to a first material. A gain medium is disposed on a third layer of the plurality of layers. The gain medium is configured to generate probe light at a second frequency in the vertical cavity laser. The method comprises disposing the first material on a fourth layer of the plurality of layers. The first material is configured to absorb or intensify the light at the second frequency when excited by light at the first frequency. The method comprises disposing an optical resonator comprising a plurality of reflecting elements on at least one layer of the plurality of layers. The optical resonator is configured to generate output light. The method comprises electrically coupling a detector to the interior of the enclosure. The detector is configured to detect the output light. The method comprises electrically coupling temperature control circuitry to the plurality of layers. The temperature control circuitry is configured to adjust a temperature of one or more layers. Each respective layer of a plurality of layers is stacked vertically with respect to another respective layer. The plurality of layers is thermally insulated from the exterior of the enclosure. One of the plurality of layers is thermally insulated with respect to another of the plurality of layers.

Other embodiments are also disclosed, as subsequently described.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as subsequently described and in conjunction with the detailed description.

Figure 1:
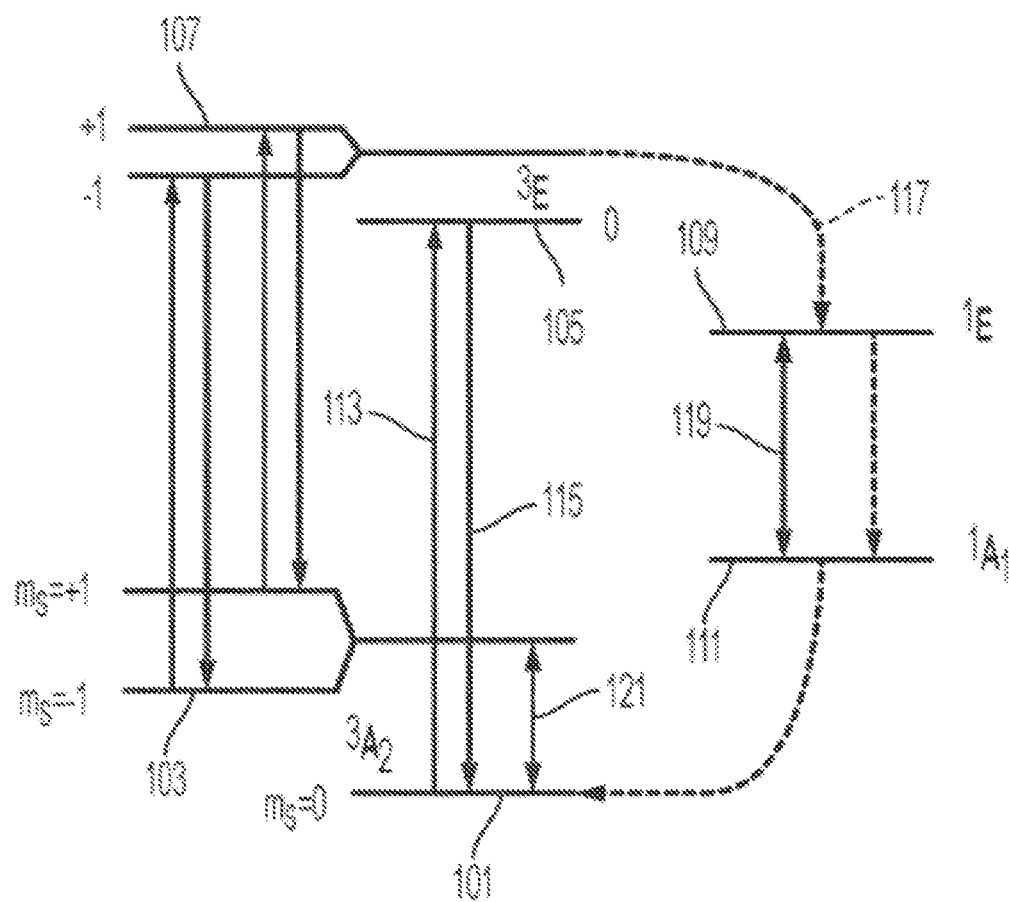
FIG. 1 depicts a diagram illustrating transitions between the various states of a first material used for fabricating a magnetometer.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, any methods presented in the drawing figures and the specification are not to be construed as limiting the order in which the individual steps may be performed. The following detailed description is, therefore, not to be taken in a limiting sense.

FIG. 1 is a diagram illustrating transitions between the various states of an exemplary first material used for fabricating a magnetometer. For example, some materials have certain physical characteristics that allow the material to be responsive to magnetic fields. The first material may be a nitrogen vacancy (NV) diamond, silicon carbide with defect centers, or other material having addressable energy levels that are sensitive to a magnetic field. As used herein, NV diamond refers to a diamond-based material having multiple point defects where a point defect includes a nearest-neighbor pair of a nitrogen atom substituted for another atom (say, a carbon atom) and a lattice vacancy. Such a material can be fabricated as an absorbent layer 314 implemented in the vertical cavity laser (VCL) magnetometers described herein. The first material is described in the context of FIG. 1 as an absorbent material (i.e. a material that absorbs light) to illustrate the properties of the material. However, such properties can, in some embodiments, also classify the first material as an emission material (i.e. a material that generates or intensifies light), as further described in FIG. 3.

As illustrated, the first material may have a ground state that is a spin triplet state. The ground state may have multiple spin projections: a ground antiparallel 101 of spin projection 0 and ground parallel spins 103 with spin projections of +/−1, where the ground antiparallel spins 101 and the ground parallel spins 103 are separated by a resonant frequency 121. In the absence of a magnetic field, when the first material is NV diamond, the resonant frequency is approximately 2.87 GHz. Additionally, the point defects within the first material may be optically excited through spin conserving transitions to a spin triplet excited level, where the triplet excited level also has multiple spin projections: an excited antiparallel spin 105 of spin projection 0 and excited parallel spins 107 with spin projections of +/−1. To optically excite the point defects, the first material may be exposed to a pump light having a particular frequency. For example, in NV diamond, laser light having a wavelength of 532 nm may cause spin conserving transitions from the ground triplet state to the excited triplet states.

When the point defects within the first material are at the excited state, the defects relax either through a radiative transition 115 or through an intersystem crossing 117. When the point defects relax through a radiative transition 115, the point defects fluoresce and return to the ground triplet states. For example, NV diamond point defects generally emit light having a wavelength of 637 nm during radiative transitions 115. When a point defect relaxes through an intersystem crossing 117, the point defect will not fluoresce and will transition to a shelved state, where the shelved state is a shelved ground state 111 or a shelved excited state 109. Additionally, when the point defects are in one of the shelved states 109 and 111, the point defects absorb probe light 119 having a particular frequency. For example, NV diamond point defects in the shelved states 109 and 111 absorb probe light 119 having a wavelength of 1042 nm.

In some implementations, a low-energy radiation field is applied to the first material to increase the rate of intersystem crossings 117. Such a low energy radiation field can include light at a frequency range in the radio frequency (RF) range of the electromagnetic spectrum. As used herein, RF light also includes light in the microwave range of the electromagnetic spectrum, and microwave radiation is described as a particular example of the RF spectrum. For a NV diamond material, a microwave frequency resonant with the transition 121 is applied to the first material to increase the rate of intersystem crossings 117 as compared to radiative transitions 115. In the first material, non-radiative intersystem crossings 117 may be strongly spin selective. For example, point defects having parallel spins 107 are more likely to experience an intersystem crossing 117 to the shelved states 109 and 111. In contrast, point defects having excited antiparallel spins 105 are more likely to experience a radiative transition back to the ground triplet state. To increase the probability of intersystem crossings, a microwave frequency is applied to the first material equal to the resonant frequency for the first material. For example, when the first material is NV diamond (resonant frequency approximately 2.87 GHz), applying a frequency of 2.87 GHz to the first material will increase the probability of intersystem crossings 117 to the shelved states 109 and 111.

Additionally, when a microwave signal at the resonant frequency is applied to the first material, the probe light 119 is more likely to be absorbed by the first material as the population of point defects at the shelved states 109 and 111 within the first material is greater than when the first material is not exposed to the energy at the resonant frequency. Accordingly, when the probe light 119 is applied to the first material in the absence of the microwave signal at the resonant frequency, the probe light 119 is not absorbed by the first material as efficiently. For example, when a NV diamond material is exposed to a microwave signal having a frequency of 2.87 GHz, the NV diamond material begins to absorb probe light 119 having a wavelength of 1042 nm at an increased rate.

In some implementations, the resonant frequency for the first material changes in the presence of a magnetic field. For example, when the first material is exposed to a magnetic field, the Zeeman effect causes the resonant frequency to experience a shift in proportion to the strength of the experienced magnetic field. In the presence of a magnetic field, the resonance frequency splits into two different resonant frequencies, where the difference between the two resonant frequencies is proportional to the applied magnetic field. This splitting behavior is depicted in the ms=+1 and ms=−1 states of level 103 in FIG. 1. Accordingly, the resonant frequency at which the probe light 119 is absorbed by point defects in the first material can be monitored to determine the strength of a magnetic field experienced by the first material.

In some implementations, the point defects within the first material are in one of multiple different orientations. For example, when the first material is NV diamond, each point defect can be in one of four different orientations. The first material can have many point defects in each of the four different orientations. Accordingly, vector information for a magnetic field is extracted from the first material when probe light 119 is applied to the first material. For example, when the first material is exposed to a magnetic field, the resonant frequencies for a point defect shift based on the orientation of the point defect in relation to the experienced magnetic field. When the point defects in the first material are in multiple different orientations, the point defects in the first material have separate resonant frequencies associated with each of the different orientations of the point defects. Therefore, characteristics such as the vector information for the magnetic field is determined by identifying which resonances correspond to the different orientations of the point defects in the first material. In some implementations, biased magnetic fields are applied to the first material to aid in determining which resonance frequencies are associated with particular orientations of the point defects.

In the examples described herein, the first material is incorporated within a magnetometer that exposes the first material to a pump light 113 to cause the point defects within the first material to move to the excited triplet state. The magnetometer may also expose the first material to RF energy in a range of frequencies that includes the resonant frequency 121 for the first material, where a probability of intersystem crossings 117 to shelved states 109 and 111 increases at the resonant frequency 121 as described above. Additionally, the first material is exposed to probe light 119 (e.g., by a gain material disposed in the VCL 302), where the probe light 119 is absorbed by point defects in the shelved states 109 and 111. Accordingly, an applied microwave signal is swept through a range of frequencies to identify the resonant frequencies associated with the different orientations of the point defects within the first material. The resonant frequencies may be identified when the intensity of the applied probe light 119 that passes through the first material decreases, indicating that the applied probe light 119 was absorbed by the point defects within the first material. Based on the identified resonant frequencies, a magnetic field experienced by the first material may be calculated with high sensitivity to magnetic field changes; low size, weight, and power; and a robustness that could enable the use of a resulting magnetometer in many magnetic based or aided applications such as in navigation.

Figure 2:
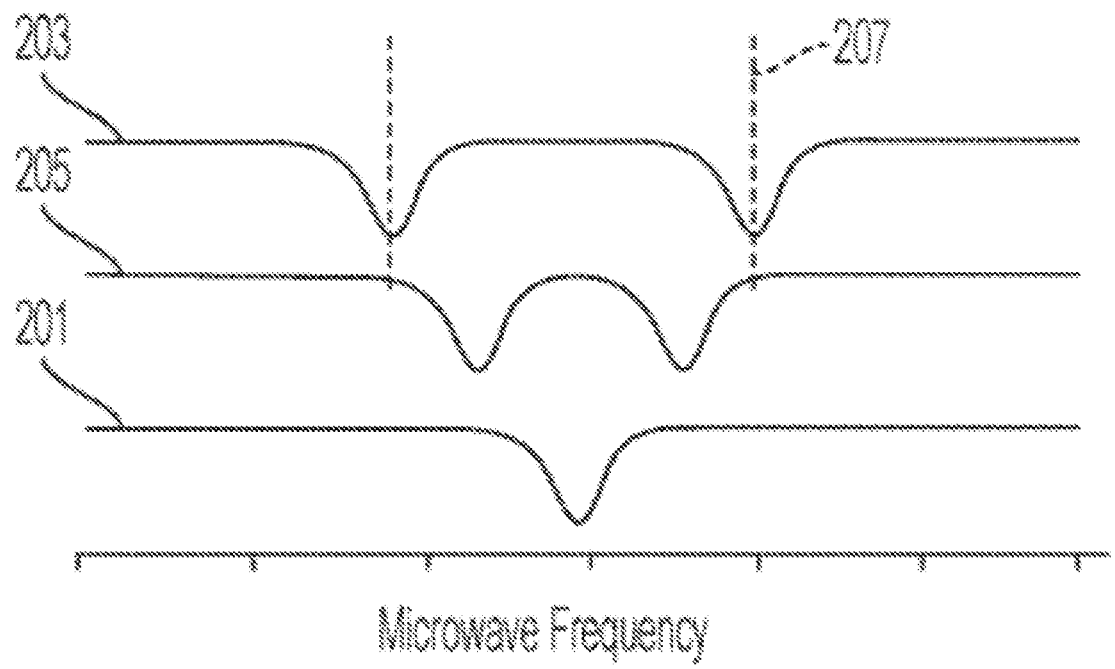
FIG. 2 depicts a graph illustrating the detection of an external magnetic field based on the identification of resonance lines in an applied RF field.

FIG. 2 is a graph illustrating the detection of a magnetic field based on the identification of resonance lines in an applied microwave field that is swept through a range of frequencies. As previously described, a first material may be exposed to a range of microwave frequencies, where the range of applied frequencies includes the different resonant frequencies for the first material. Additionally, the different resonant frequencies are associated with the strength of the magnetic fields experienced by the first material. The first material may also have different resonant frequencies associated with the different orientations of point defects within the first material.

As illustrated, FIG. 2 shows various graphs of the intensity of a probe laser as emitted from the first material at different microwave frequencies applied to the first material for three different magnetic field strengths. Intensity curve 201 shows the intensity of the emitted probe source at different frequencies when the first material is not exposed to a magnetic field. When light from a probe source (e.g., gain layer 310 in FIG. 3) is coupled into the first material in the absence of an applied magnetic field, the first material will not experience a Zeeman resonance shift and the probe light 119 will be absorbed at the single resonant frequency for the first material. Accordingly, the intensity 201 of the output light may decrease at the single resonant frequency for the first material.

But when the first material is exposed to different magnetic field strengths, the resonant frequency may experience a frequency shift in proportion to the experienced magnetic field strength. For example, intensity curve 205 and intensity curve 203 illustrate an intensity of the emitted probe light 119 by the first material in the presence of different magnetic field strengths. For example, the magnetic field strength experienced by the first material associated with intensity curve 203 is greater than the magnetic field strength experienced by the first material described by intensity curve 205. Accordingly, the magnitude of the shift of the resonant frequencies is greater when the first material is exposed to a greater magnetic field strength. To identify the magnitude of the shift of the resonant frequency, a system (e.g., processing system 810) identifies the frequencies 207 associated with significant changes in the intensity of the probe light 119 emitted by the first material. Based on the magnitude of the shift of the resonant frequency, a system determines the magnetic field experienced by a point defect. Additionally, when there are multiple resonant frequencies, the system may identify the orientations of the point defects associated with the different resonant frequencies and the direction of the experienced magnetic field.

Figure 3:
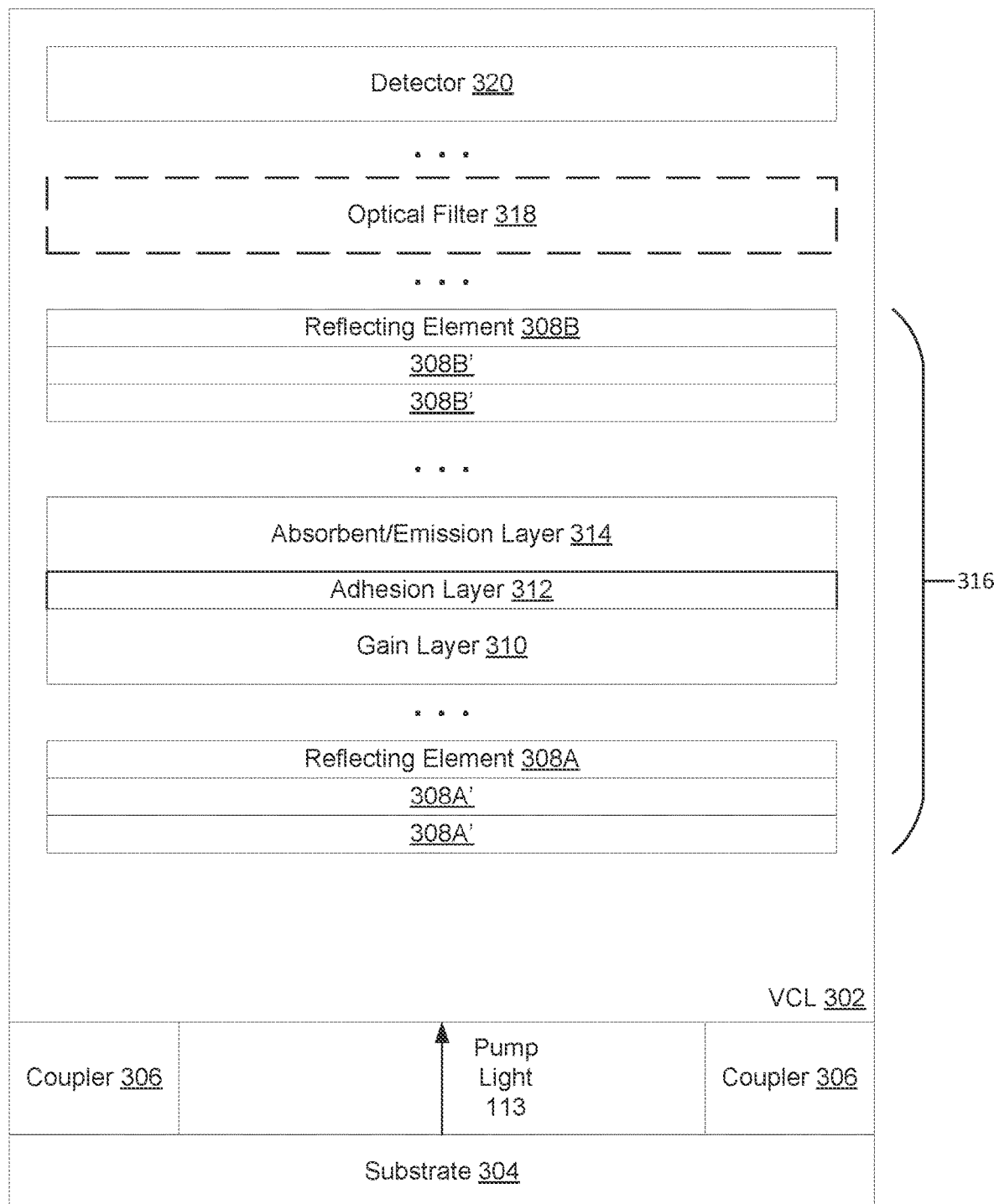
FIG. 3 depicts a block diagram of a vertical cavity laser, as described in one or more embodiments.

FIG. 3 depicts a block diagram of a system 300 that can be implemented as part of a threshold magnetometer. System 300 includes a VCL 302 coupled to one or more substrates 304 via one or more couplers 306 (two of which are shown in FIG. 3). Couplers 306 can be any kind of coupler that attaches VCL 302 to substrate 304. Substrate 304 can be any composed of any suitable material configured for integrated photonics application, and may include waveguides or other optics disposed on or embedded in substrate 304. For example, substrate 304 can include a pump light source such as a laser that emits pump light 113 into the VCL 302 (and can be disposed in the VCL 302 as well). Substrate 304, and system 300 more generally can be implemented as part of an integrated photonics circuit. In some implementations, the integrated photonics circuit is an integrated photonics chip fabricated on the micron level scale.

VCL 302 is composed of a series of layered elements stacked vertically to one another. Each layer includes an optical material or component and is optically coupled with respect to each layer. In embodiments with an external pump source, VCL 302 is configured to receive the pump light 113 through one or more optical ports that couple VCL 302 to substrate 304.

In the VCL 302, an optical resonator (OR, see FIG. 4) 316 is disposed between one or more of the stacked vertical layers. In the embodiment shown in FIG. 3, optical resonator 316 is formed by disposing at least one first reflecting element 308A in at least one layer that is vertically stacked with at least one second reflecting element 308B in at least one layer. In this illustrated embodiment, the at least one first reflecting element 308A is depicted as a set of three vertically stacked elements comprising element 308A directly coupled to additional elements 308A'. At least one second reflecting element 308B is similarly depicted; however, any number of elements 308A', 308B' can be used. In some embodiments, each element in the set is disposed on its own distinct layer in the VCL 302.

The plurality of reflecting elements 308A, 308B, are configured to be at least partially reflective of the probe light 119 wavelength. They are optically coupled to achieve resonance for the probe light 119. In some embodiments, reflecting element 308A and reflecting element 308B comprise a set of distributed Bragg reflectors. In one example, Bragg reflectors 308A, 308B (or other reflecting elements such as dielectric mirrors or metal mirrors) reflect entering or propagating probe light 119 between the resonator 316 cavity. Pump light 113 can also enter and pass through the optical resonator 316. Reflecting elements 308A are designed for high transmissivity for the pump light 113. Additionally, reflecting elements 308B could be designed as high reflective elements for pump light 113 to recycle and pump and increase the pump absorption efficiency.

Inside the optical resonator 316 is a gain layer 310 disposed in between the layers comprising the reflecting element(s) 308A and the layers comprising the reflecting element(s) 308B. Gain layer 310 acts as the gain medium for the optical resonator 316 and the VCL 302 more generally, and is configured to amplify the intensity of the probe light 119 in the gain layer 310. In some embodiments, gain layer 310 comprises a material composed of indium arsenide (InAs), gallium arsenide (GaAs), or a chemical composition thereof. For example, the gain layer 310 can include InAs/GaAs quantum dots and/or GaInAs/GaAs quantum wells fabricated by optically pumping the gain medium.

In some embodiments, gain layer 310 is configured to undergo a nonlinear photon generation process to generate probe light 119 in the VCL 302. In these embodiments, gain layer 310 includes nonlinear optical properties that may depend on the intensity of the probe light 119. When the intensity of the probe light 119 increases above a threshold power level, the high intensity of the probe light 119 triggers the nonlinear optical properties of the gain layer 310 and causes the gain layer 310 to generate photons that satisfy the resonance condition of the optical resonator 316. Various nonlinear photon generation processes can be used, such as stimulated Brillouin scattering (SBS), optical parametric amplification, optical frequency comb formation, or others, to excite the probe light 119. Each nonlinear photon generation process may correlate with a different threshold power level that triggers the desired nonlinear properties of the optical resonator 316. In the case of SBS, the probe light 119 will be produced by the pumping laser that generates the pump light 113 at a shorter wavelength and in the case of optical frequency comb generation, many frequencies that are evenly spaced will be produced. So long as the intensity of the light remains at the threshold power level, optical resonator 316 continues to generate the probe light 119.

Figure 4:
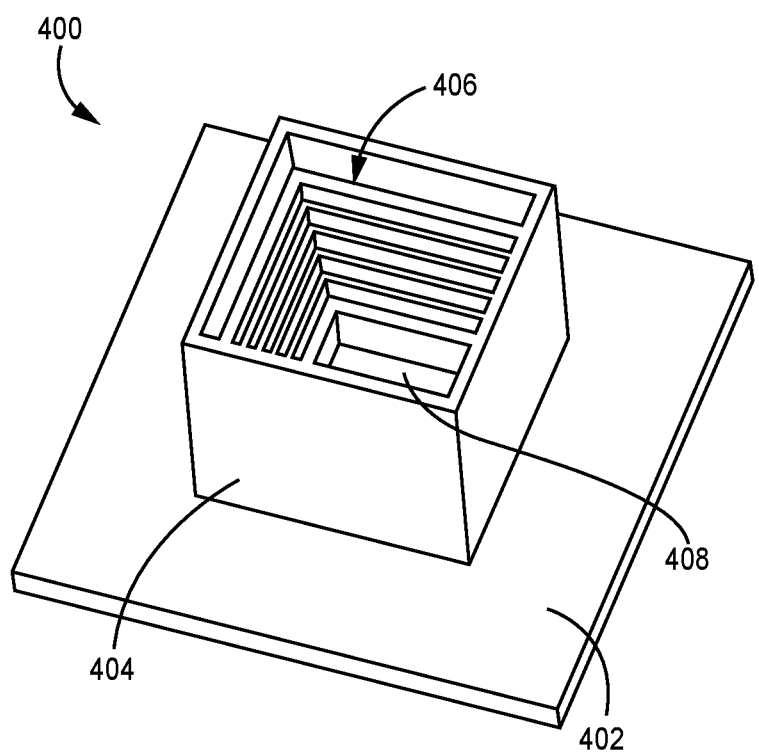
FIG. 4 depicts an isometric view of an enclosure configured to enclose a vertical cavity laser, as described in one or more embodiments.

Absorbent/Emission layer ((A/E)L, see FIG. 4) 314 is also disposed inside the optical resonator 316 and comprises the first material previously described in conjunction with FIGS. 1-2. As previously noted, absorbent layer 314 can include a material composed of NV diamond. In some embodiments, the first material is an absorbent material that causes the absorbent/emission layer 314 to act as an absorbent layer 314. In these embodiments, absorbent layer 314 absorbs the probe light 119 propagating in the optical resonator 316 when excited. In the absence of an external magnetic field, absorbent layer 314 absorbs probe light 119 at a single resonant frequency, but depending on the composition and orientation of the point defects in the absorbent layer 314, can absorb probe light 119 at multiple resonant frequencies when exposed to an external magnetic field. In some embodiments, the gain layer 310 is coupled to an absorbent layer 314 via a thin adhesion layer 312.

In an excited state, absorbent layer 314 absorbs the probe light 119 propagating in optical resonator 316, thereby decreasing the intensity of the probe light 119 in the VCL 302. Doing so causes the power level of the probe light 119 to fall below the threshold power level needed for the gain layer 310 to undergo the nonlinear photon generation process previously described (in embodiments where gain layer 310 is configured to do so). As a result, gain layer 310 is no longer able to generate photons in this manner, and the output light of optical resonator 316 noticeably decreases in intensity.

Some of the output light can pass through the optical resonator 316 (at least when not impeded by absorbent layer 314) to an optional optical filter 318, disposed on a stacked layer above the optical resonator 316. In some embodiments, optical filter 318 is configured to only allow the probe light 119 to pass through. The filtered output light is then collected at a detector 320, which can be a photodiode or other optical detector. When absorbent layer 314 is excited, detector 320 detects little to no output light for each RF and/or microwave signal radiated to the absorbent layer 314 that corresponds to a resonant frequency of the point defects in the absorbent layer 314. In the presence of an external magnetic field, detector 320 perceives a minimum probe intensity at the output of the optical resonator 316 for multiple resonant frequencies corresponding to the Zeeman shift of the resonant frequency of the point defects. In the absence of an external magnetic field, detector 320 will detect an intensity minimum corresponding to the single resonant frequency of a point defect in the excited absorbent layer 314, and will detect an intensity maximum when the absorbent layer 314 is not absorbing the probe light 119.

The layered sequence of the components shown in VCL 302 can change depending on the embodiment. For example, additional layers with additional optics disposed thereon can be present in optical resonator 316 between the reflecting elements 308A, 308B, and the absorbent layer 314 in the resonator cavity. Additionally, the order of the absorbent layer 314 and gain layer 310 can be modified in the optical resonator 316. In one embodiment, absorbent layer 314 is disposed on a stacked layer below the gain layer 310.

Further embodiments to the design of the VCL 302 can be made. Whereas in FIG. 3 the absorbent layer 314 and gain layer 310 are composed of distinct materials and disposed on different stacked layers of VCL 302, in some embodiments, absorbent layer 314 is also configured to act as a gain medium for the probe light 119. In this stimulated emission scheme, an absorbent layer 314 comprising a gain medium is disposed on at least one stacked layer in the optical resonator 316. When its absorbent properties are not triggered (e.g., when not excited by pump light 113), absorbent layer 314 amplifies the probe light 119 entering the optical resonator 316 and detector 320 detects an intensity maximum for the output light. Then, when triggered by pump light 113, the absorbent layer begins absorbing the intensity of the probe light 119 when subjected to an RF and/or microwave signal at the resonant frequenc(ies) of the point defects.

In another stimulated emission scheme, the first material, for example NV-diamond, is configured not as a light absorber but as an amplifier (e.g., as a gain medium). Similarly as previously described, the first material is disposed on an emission layer 314. When the first material is not excited by the pump light 113, the probe light 119 amplified by gain layer 310 exits the optical resonator 316 at a first intensity. Once the first material becomes excited by the pump light 113, emission layer 314 further amplifies the probe light 119 to a higher intensity that is detected by the detector 320. The detection of the higher intensity can be used as a measurement event to determine the resonant frequencies that correspond to the high intensity output analogous to the absorption scheme previously described.

Still referring to FIG. 3, the VCL 302 can be fabricated based on the following exemplary technique. First, a first material is prepared with point defects. This first material can then be constructed via polishing or ion splicing into a thin horizontal film (e.g., approximately 1 micron thickness) that forms the absorbent/emission layer 314, depending on the properties of the first material as an absorbent or emission material. The adhesion layer 312 is grown on one side of the absorbent/emission layer 314, followed by growth of the gain layer 310 on the adhesion layer 312. The layer complex comprising the absorbent/emission layer 314, adhesion layer 312, and gain layer 310 can then be deposited onto a suitable VCL substrate. On either side of the layer complex, the reflecting elements 308A, 308B are deposited onto the VCL substrate 304 to form the optical resonator 316. When implemented, optical filter 318 is then deposited above reflecting element 308B. The detector 320 can then be deposited on a top layer of the VCL 302.

FIG. 4 depicts an isometric view of an enclosure 400 configured to enclose a vertical cavity laser, such as the VCL 302 described and illustrated in conjunction with FIG. 3. The enclosure 400 can be implemented as a leadless chip carrier (LCC) that provides thermal and vibrational insulation for the VCL. The enclosure 400 itself can be fabricated using any suitable material for integrated photonics applications, and can be fabricated on an integrated photonics chip as part of an integrated circuit architecture. The enclosure 400 shown in FIG. 4, and the accompanying Figures, can be manufactured at the chip scale, on the micron or millimeter level. In doing so, a magnetometer implementing the enclosure 400 can operate with reduced size, weight, and power, and can be available for a wider variety of vehicles.

Enclosure 400 includes an exterior 404 and interior 406. It is disposed on a base 402 which can be the same substrate material as the surrounding integrated photonics chip or circuitry. The exterior 404 can be the same substrate material as the base 402 or other suitable photonics material that provides efficient thermal insulation. In the embodiment of FIG. 4, the exterior 404 forms a cubic shape understanding that the exterior 404 can be formulated into other formats with differing dimensions. The interior 406 of the enclosure 400 is configured to house the VCL 302. It includes a series of vertically stacked platform layers in which one component of the VCL 302 is disposed on. Each platform layer is scaffolded to have distinct dimensions, so that the length/width of the lowest platform layer is smaller than the length/width of the next lowest platform layer, and so on until the highest platform layer which has the largest length/width in the interior 406. The interior 406 also comprises a bottom 408 that insulates the VCL 302 from the surrounding environment.

As subsequently described in more detail, enclosure 400 includes integrated electrical connections from the interior 406 to the exterior 404 and base 402. The electrical connections each respective platform layer, and the respective VCL 302 component disposed thereon, to other photonics circuitry external to the exterior 404 of the enclosure 400 (see FIG. 7).

Figure 5:
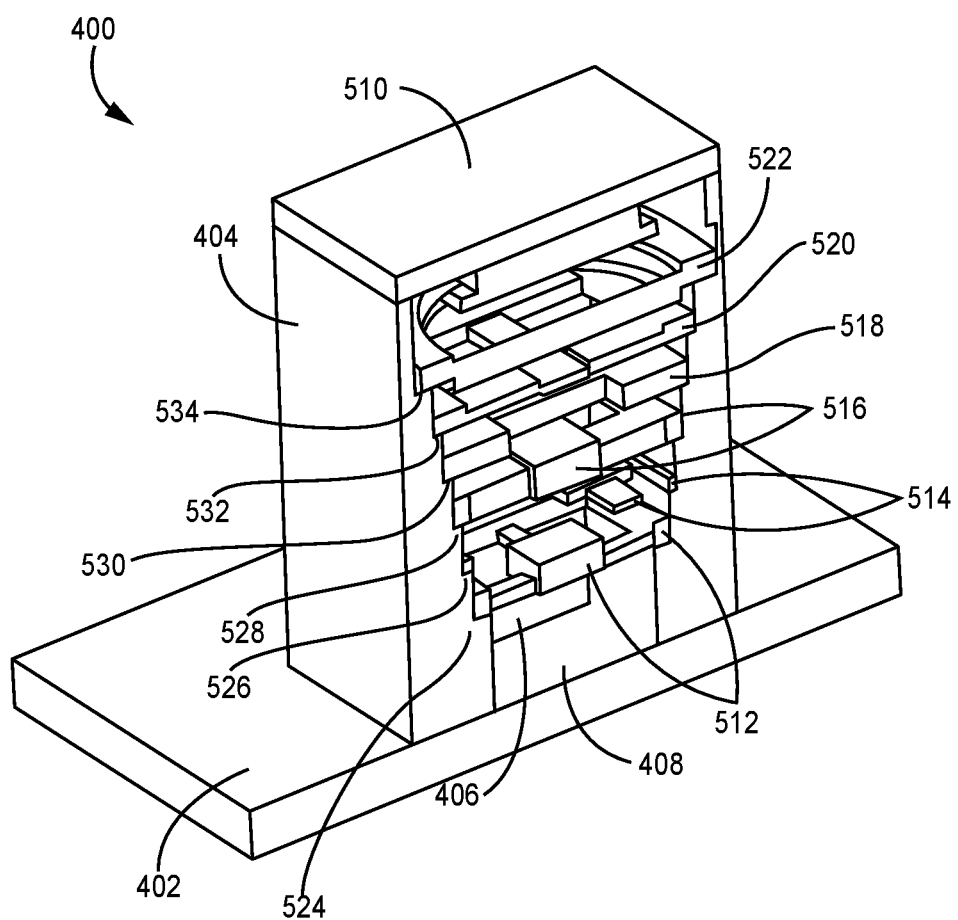
FIG. 5 depicts an isometric cutaway view of an enclosure with a vertical cavity laser disposed therein, as described in one or more embodiments.

FIG. 5 depicts an isometric cutaway view of an enclosure 400 with a vertical cavity laser 302 disposed therein. The interior 406 of the enclosure 400 is hermetically-sealed on the top by a cover 510. Accordingly, the interior 406 is sealed from the exterior environment. Besides the components of the VCL 302, the environment of the interior 406 can be filled with an inert gas or vacuum.

In the embodiment illustrated in FIG. 5, the interior 406 of the enclosure 400 is fabricated into a hierarchical arrangement of stair-like protrusions ("steps"), with each step (from the top step 534 to the bottom step 524) protruding further into the interior 406 cavity. In the embodiment of FIG. 5, there are a total of six steps 524, 526, 528, 530, 532, 534 vertically oriented on each side of the interior 406, with the bottom step 524 extending furthest into the interior 406 cavity and the top step 534 closest to the enclosure exterior 404. Each of these steps 524, 526, 528, 530, 532, 534 provides support for a respective platform substrate in which a component of the VCL 302 is disposed on. In the embodiment of FIG. 5, there are a total of six platform substrates 512, 514, 516, 518, 520, 522 (ordered from bottom substrate 512 to the top substrate 522).

Each platform substrate 512, 514, 516, 518, 520, 522 is tethered to, and rests on, the respective step 524, 526, 528, 530, 532, 534 on each side of the interior 406 cavity in mechanical equilibrium. The platform substrates 512, 514, 516, 518, 520, 522 (and the interior 406 more generally) can be made of a polyimide material or other insulating material that thermally insulates the VCL 302 component disposed on the respective platform substrate 512, 514, 516, 518, 520, 522 from heat transfer with the enclosure 400 and the other platform substrates.

Also shown in FIG. 5, each VCL 302 component is disposed on a respective platform substrate 512, 514, 516, 518, 520, 522. Each VCL 302 component can couple to a platform substrate 512, 514, 516, 518, 520, 522 in different ways. For example, a VCL 302 component can be disposed on top of a platform substrate, as shown with respect to platform substrate 522 forming the top layer. Here, the platform substrate 522 extends from one step 534 to the equivalent step 534 formed on the other side of the enclosure interior 406. Disposing a VCL 302 component on the top of a given platform substrate 522 tends to reduce the thermal contact of one VCL 302 relative to another, and hence, reduce the extent of thermal interference.

Depending on the design of the interior 406 and the configuration of the VCL 302, in some embodiments, a VCL 302 component may be partially or wholly integrated into its respective platform substrate. For example, platform substrate 512 is coupled to the bottom steps 524 of the enclosure interior 406 with its respective VCL 302 component partially integrated in. For some platform substrates, such as platform substrate 518, the platform substrate includes a transparent center in which light can pass through.

Figure 6:
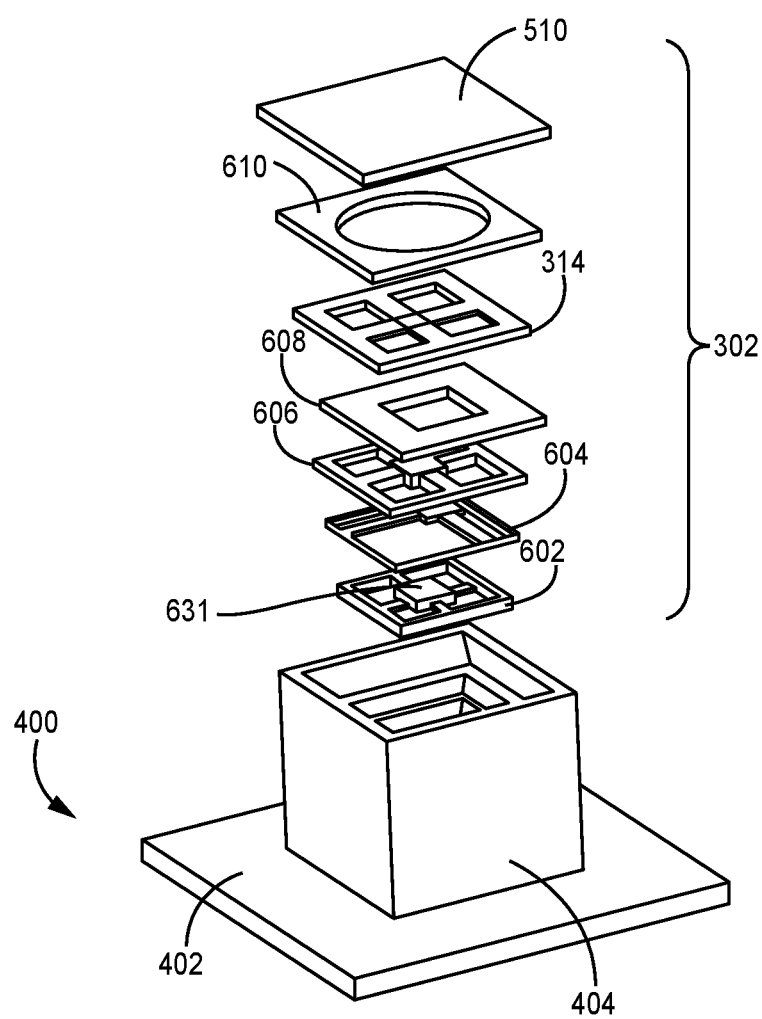
FIG. 6 depicts an exploded isometric view of the enclosure and components of the vertical cavity laser of FIG. 5, as described in one or more embodiments.

FIG. 6 depicts an exploded isometric view of the enclosure 400 and components of the VCL 302 of FIG. 5. The components of the VCL 302 are ordered in respective layers of the enclosure interior 406 as shown in FIG. 6. VCL 302 first comprises an optional probe laser 602. Probe laser 602 is disposed on platform substrate 512 and configured to generate the probe light 119 described in conjunction with FIGS. 1-3. In the embodiment illustrated in FIG. 6, probe laser 602 includes a laser source 631 disposed in the center of the layer that generates the probe light 119 and emits the probe light 119 vertically up into the interior 406 cavity of the enclosure 400. However, in some embodiments, probe laser 602 is optional. If operated as a laser threshold magnetometer, the probe light 119 is generated by the gain material disposed on the gain layer 310. In other embodiments, such as when resonator 316 is used as a passive resonator to increase the effective sensing length, then probe laser 602 can be implemented to generate the probe light 119 without a gain material disposed on gain layer 310.

A pump laser 604 is then disposed on the next layer above the probe laser 602, i.e., on platform substrate 516. Pump laser 604 is configured to generate and emit pump light that excites the first material disposed in the absorbent/emission layer 314. In some embodiments, pump laser 604 is disposed off-center from platform substrate 516. In these embodiments, pump laser 604 emits the pump light at an angle to the first material with respect to the horizontal axis. In some embodiments, the pump laser 604 can be disposed on the same layer as the probe laser 602.

Above the pump laser 604 is a tunable filter 606 disposed on platform substrate 516. Filter 606 can be implemented to enforce single frequency operation at the probe light 119 wavelength.

An RF scanner 608 is disposed on platform substrate 518 above the cavity filter 606. The RF scanner 608 is configured to emit radio frequency radiation in a range of frequencies to the first material. As previously noted, the frequency range emitted by RF scanner 608 includes the resonant frequency of the first material in the absence of an external magnetic field, and also includes a suitable range that covers the splitting of the resonance frequency from the Zeeman effect when an external magnetic field is present. In the embodiment of FIG. 6, the RF scanner 608 is transparent in the center to enable the pump light 113 and the probe light 119 to reach the first material.

VCL 302 also comprises an absorbent/emission layer 314 that is disposed on platform substrate 520. In the embodiment of FIG. 6, absorbent/emission layer 314 comprises a first material such as NV diamond located in the center of the absorbent/emission layer 314. The first material disposed on the absorbent/emission layer 314 receives the probe light 119 generated by probe laser 602 and/or gain layer 310 in addition to the pump light 113 from pump laser 604. Additionally, the first material disposed on the absorbent/emission layer 314 receives the RF emission from RF scanner 608. In response to receiving the emission from RF scanner 608 and pump laser 604, absorbent/emission layer 314 absorbs or amplifies the probe light 119 emitted by probe laser 602 and/or gain layer 310.

In the embodiment of FIG. 6, a cavity mirror 610 is disposed on platform substrate 522 near the top of the enclosure 400. The cavity mirror 610 acts as the output coupler for optical resonator 316 described in conjunction with FIG. 3. When the first material on absorbent/emission layer 314 is not excited, the VCL 302 operates above the lasing threshold, and cavity mirror 610 outputs light at a nominal intensity; however, when the first material on absorbent/emission layer 314 is excited by the pump light 113 at the frequency of the RF emission from RF scanner 608, the VCL 302 either generates little or high output light through cavity mirror 610, depending on whether the first material absorbs or intensifies the light in the cavity.

The output light is received on a photodiode or other detector 320 disposed on the top 510 of the enclosure interior 406. In some embodiments, an optical filter 318 is also disposed on the top 510 to only allow probe light 119 to be detected by the detector 320. Although not shown in FIG. 6, the top 510 is coupled to processing circuitry that receives electrical signals from the detector 320 and uses these electrical signals to determine characteristics of an external magnetic field.

Figure 7:
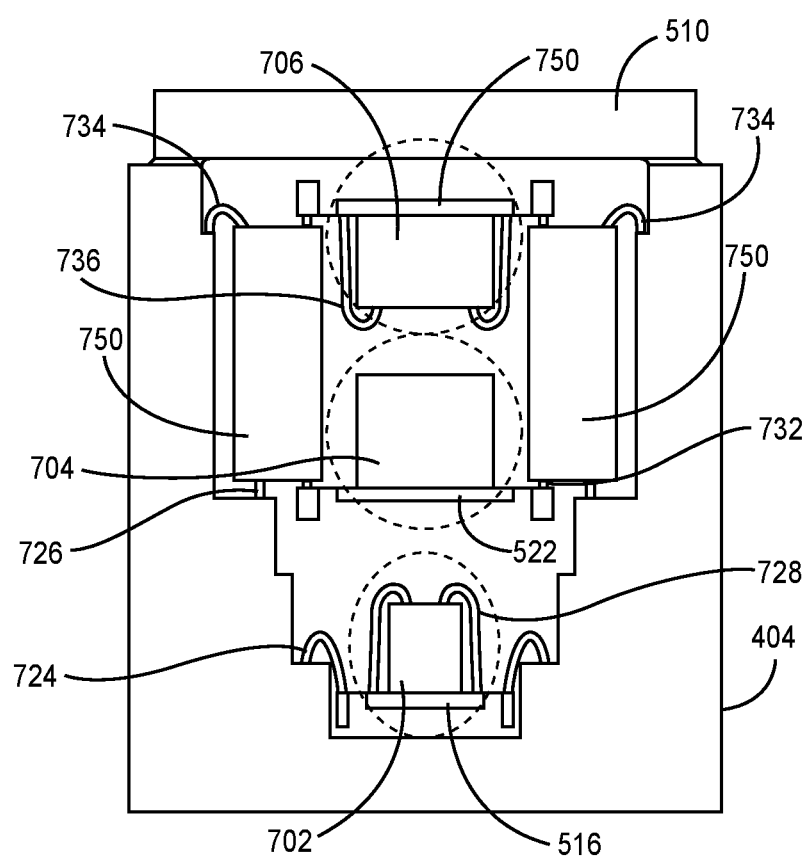
FIG. 7 depicts a side cutaway view of an enclosure with electrical contacts for selective thermal isolation and control, as described in one or more embodiments.

FIG. 7 depicts a side cutaway view of an enclosure 400 with electrical contacts for selective thermal isolation and control. The interior 406 of the enclosure depicted in FIG. 7 is exemplary and does not necessarily include all the components or coupling of the VCL 302 components described in conjunction with FIGS. 3-6. Rather, the enclosure is illustrated in FIG. 7 to show the coupling of the different layers of the VCL 302 to the enclosure 400.

Generally, each platform substrate and at least some VCL 302 components are connected to the enclosure 400 by one or more electrical leads. Referring to first VCL component 702 (which, for example, can be pump laser 604) disposed on platform substrate 516, multiple electric leads 728 couple electrical signals from the first VCL component 702 to the platform substrate 516, while multiple electric leads 724 couple electrical signals from the platform substrate 516 to the enclosure 400. Control and/or processing circuitry (not shown in FIG. 7, see FIG. 8) sends electrical signals to and from the platform substrate 516 via electrical leads 724 and these electrical signals are also fed to first VCL component 702 via electrical leads 728.

A similar arrangement exists for each layer of the VCL 302 in the enclosure 400. In some embodiments, one or more layers are coupled to the enclosure 400 by a temperature control circuit (TCC) 750. In the embodiment of FIG. 7, TCCs 750 are disposed in the interior 406 and are coupled to platform substrate 522 that comprises a second VCL component 704 (e.g., the absorbent/emission layer 314). Each TCC 750 thermally insulates the VCL components 702, 704, 706 from heat exchange with the enclosure 400. Additionally, each TCC 750 is coupled to the enclosure 400 via electrical leads 724, 734 and receives electrical signals from processing and/or control circuitry (not shown in FIG. 7) via electrical leads 724, 734. TCC 750 provides these electrical signals to platform substrate 522 via electrical leads 732 for monitoring and controlling the thermal environment of each layer, including the thermal environment of the VCL components 702, 704, 706 disposed on the layer. This enables each layer of the VCL 302 to be thermally controlled independently of other layers, which are also thermally insulated from other layers and the exterior 404 of the enclosure 400 due to the structural coupling of each layer with the enclosure 400.

Figure 8:
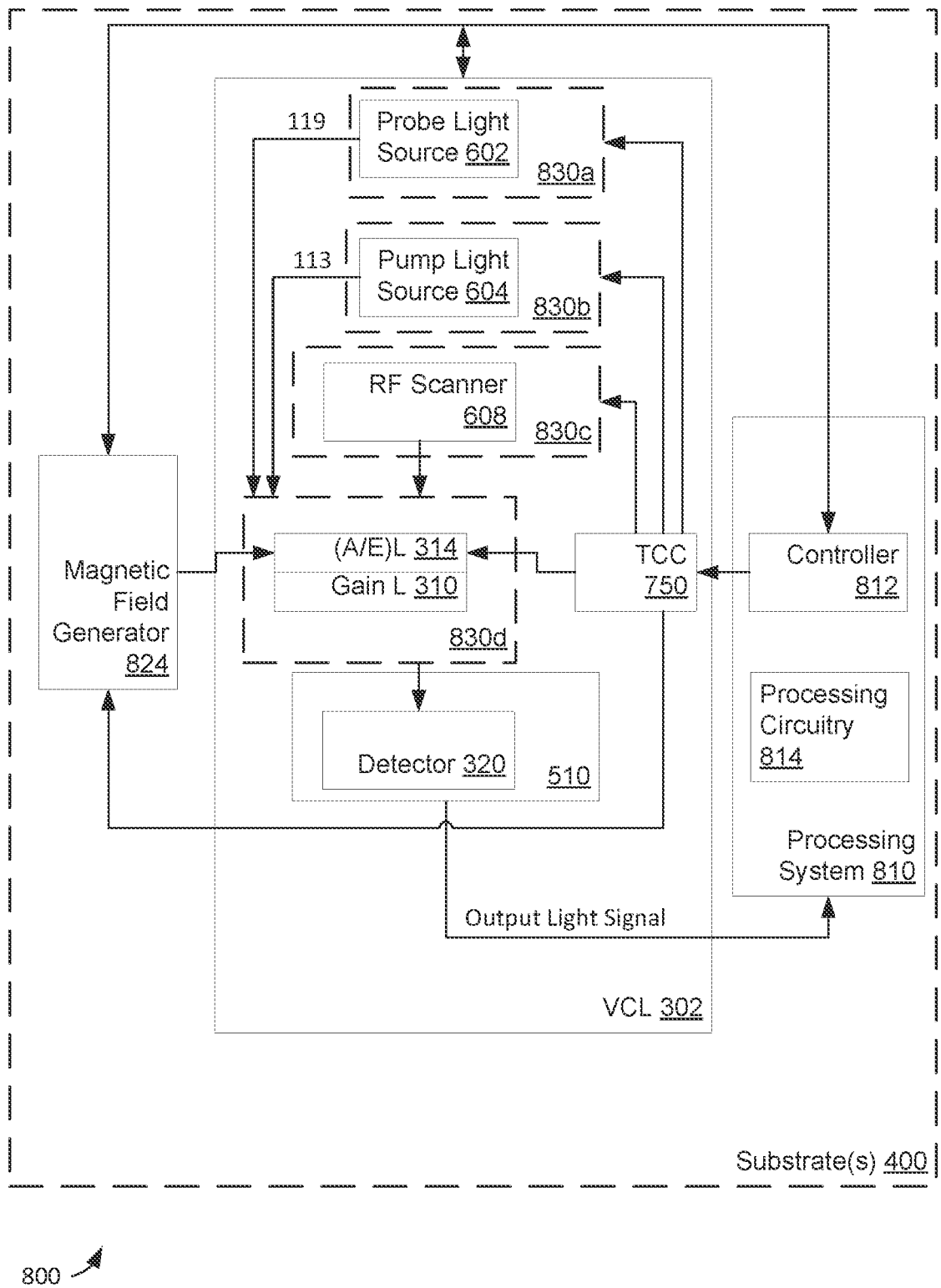
FIG. 8 depicts a block diagram of a magnetometer, as described in one or more embodiments.

FIG. 8 depicts a block diagram of a magnetometer 800, which can be implemented via the techniques described in conjunction with FIGS. 1-7. Disposed in the enclosure 400 is VCL 302, which is optically coupled to a pump light source 604, RF scanner 608, magnetic field generator 824, processing system 810, and optional probe light source 602.

Optional probe light source 602 disposed on first layer 830a is configured to generate the probe light 119 entering the VCL 302. In some embodiments, probe light source 602 is a laser source that generates probe light 119 at a wavelength of 710 nm or 1042 nm, depending on the properties of the absorbent/emission layer 314. In embodiments as a threshold magnetometer, probe light source 602 is not necessary and a gain medium disposed on gain layer 310 is used to generate the probe light 119. Pump light source 604 disposed on second layer 830b is configured to generate the pump light 113 that excites the first material on the absorbent/emission layer 314, which as an example, can be 532 nm light for an NV diamond. An RF scanner 608 disposed on third layer 830c radiates the sweeping RF field to the absorbent/emission layer 314 near the resonant frequency of the first material on the absorbent/emission layer 314. Since the resonant frequency may be shifted, RF scanner 608 radiates the RF field in a range of frequencies with suitable sensitivity to include each shifted resonant frequency induced by an external magnetic field. Magnetic field generator 824 is configured to generate a biased magnetic field to the VCL 302 to assist in detecting the resonant frequency shifts experienced by the point defects of the first material on the absorbent/emission layer 314 from an external magnetic field. Such a biased magnetic field can be generated by one or more magnetic coils. Although magnetic field generator 824 is illustrated as coupled outside of the VCL 302, in some embodiments it is disposed inside the VCL 302.

Processing system 810 is coupled to the output of VCL 302 and is configured to determine one or more characteristics of an external magnetic field based on the intensity of the output light. For example, processing system 810 includes processing circuitry 814 that receives the electrical output light signal from detector 320 signifying the intensity of the probe light 119. When the output signal indicates that an intensity extremum at the output of the VCL 302 has been observed, processing system 810 uses the corresponding frequencies emitted by RF scanner 608 (indicative of the shifted resonance frequencies of the first material on the absorbent/emission layer 314) to determine the magnetic field characteristics, including the strength and vector orientation of the field components relative to an inertial reference frame. Processing system 810 also includes a controller 812, which can output control signals to RF scanner 608 (e.g., to control the range of frequency scanning to the VCL 302) and to magnetic field generator 824 (e.g., to control the biased magnetic field to the VCL 302).

Processing system 810 via controller 812 is also configured to control the thermal environment of each layer of the VCL 302. For example, controller 812 receives signals from each of the separate layers of the VCL 302 via the various electrical leads connected to the enclosure 400 as shown in FIG. 7. Controller 812 then assesses the thermal environment of each layer of the VCL 302 and determines whether to adjust the temperature of the respective layers (including layers 830a, 830b, 830c, 830d) based on the temperature data acquired from each of the electrical leads. If controller 812 determines that temperature adjustments need to be made to one or more layers, it sends control signals to TCC 750 to provide selective heating and/or cooling to the one or more layers. For example, if controller 812 determines that only the temperature of the layer 830b (containing pump light source 604) exceeds a threshold, it activates TCC 750 to provide selective cooling to layer 830b while maintaining the temperature of the remaining layers 830a, 830c, 830d. In another example, if controller 812 determines that one or more of the optical resonator layers 830d require heating because the temperature of these layers is below a threshold, controller 812 activates TCC 750 to provide heat to these layers. In this architecture, each layer 830a, 830b, 830c, 830d is thermally insulated from one another, and so TCC 750 can selectively heat and/or cool each layer independently in the VCL 302.

TCC 750 comprises a circuit or circuitry configured to adjust the temperature in the interior 406 of the enclosure 400. In some embodiments, TCC 750 is or includes one or more thermoelectric coolers (TECs), one or more thermistors, and/or other temperature-adjusting circuitry. TCC 750 can be centralized in the enclosure 400 and connected (via electrical leads) to each layer of the VCL 302. Alternatively, TCC 750 is distributed over multiple areas of the enclosure 400 or comprises multiple circuits that are respectively coupled to the layers of the VCL 302. One TCC 750 is shown in FIG. 7 understanding that multiple TCCs 750 can be used.

Processing circuitry 814 and controller 812 may include any one or combination of processors, microprocessors, digital signal processors, application specific integrated circuits, field programmable gate arrays, and/or other similar variants thereof. Processing system 810 and its associated components may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures.

Figure 9:
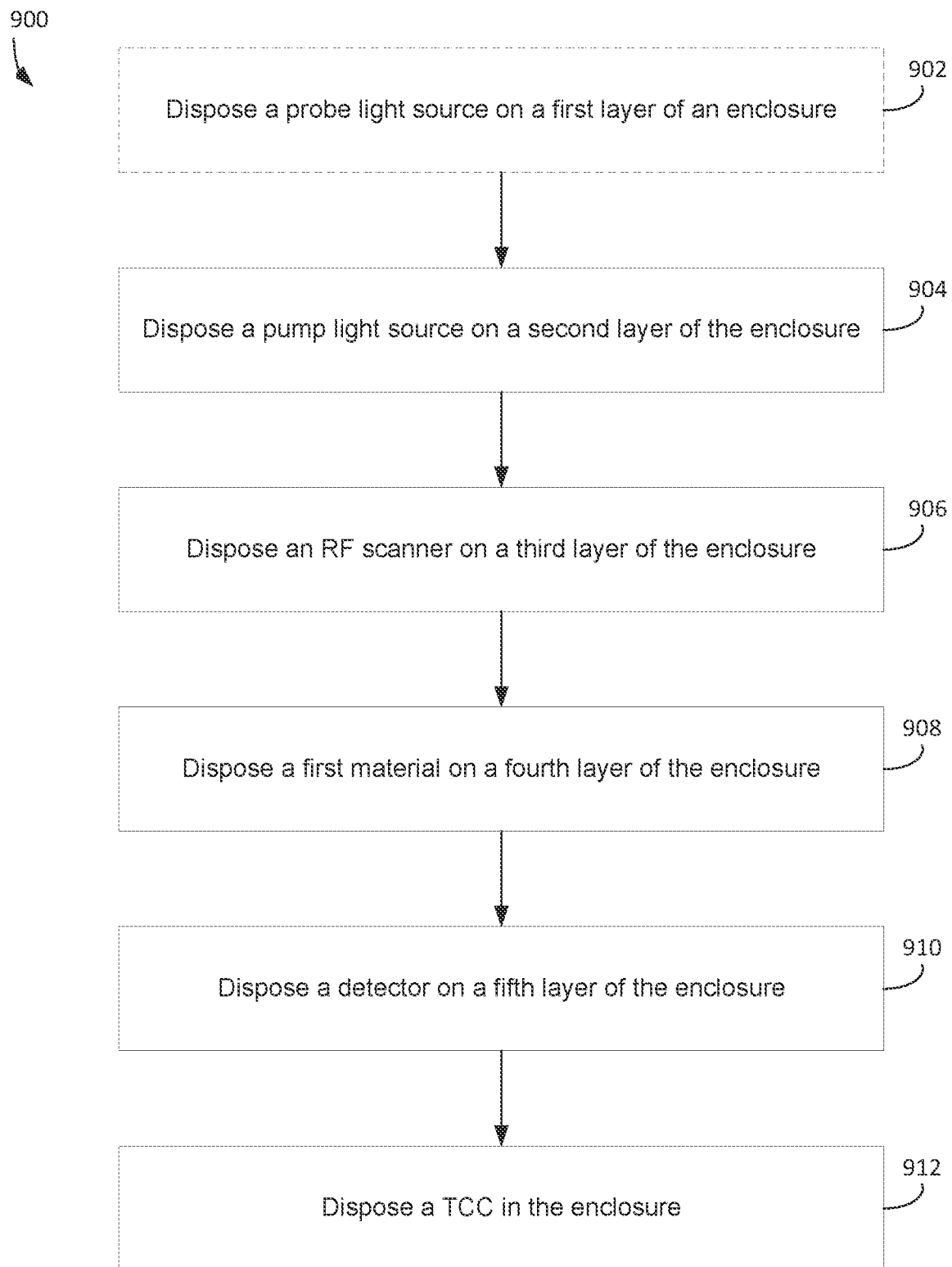
FIG. 9 depicts a flow diagram of a method for fabricating a magnetometer, as described in one or more embodiments.

FIG. 9 depicts a flow diagram of a method 900 for fabricating a magnetometer. The blocks of the flow diagram have been arranged in a generally sequential manner for ease of explanation; however, it is to be understood that this arrangement is merely exemplary, and it should be recognized that the sequence associated with method 900 (and the blocks shown in the Figure) may occur in a different order. Method 900 is described in the context of the enclosure 400 of FIGS. 1-8, such that the enclosure 400 includes an interior cavity in which the components of the VCL 302 are disposed in.

Method 900 optionally includes disposing a probe light source on a first layer of the enclosure at block 902. For example, the first layer can be the bottom layer in the interior 406 cavity on the enclosure 400 closest to the base. Referring to FIGS. 3-8, the probe light source can be disposed on a platform substrate that couples to the bottom step that lines the interior 406 cavity. The probe light source is configured to generate the probe light 119 that is absorbed by the NV diamond or other first material. However, this step is optional since the probe light 119 can be generated by a gain medium disposed in the optical resonator.

Proceeding to block 904, method 900 fabricates the magnetometer by disposing a pump light source on a second layer of the enclosure. For example, the second layer can be the layer immediately above the first layer comprising the probe light source. In some embodiments, the pump light source is disposed off-center from the interior 406 cavity and angled towards the first material. The pump light source is configured to excite the first material to absorb or intensify the probe light 119.

At block 906, method 900 fabricates the magnetometer by disposing an RF scanner on a third layer of the enclosure, which can be the layer immediately above the second layer comprising the pump light source. The RF scanner is configured to emit an RF (e.g., microwave) field in a range of frequencies to the first material, which can be used to detect the resonance frequency splitting of the first material in the presence of an external magnetic field and hence determine characteristics of the external magnetic field. In some embodiments, the RF scanner comprises a central transparent interface to enable the pump light 113 and the probe light 119 to pass through to the first material.

Method 900 fabricates the magnetometer by disposing a first material on a fourth layer ("absorbent layer") of the enclosure at block 908. The first material can be NV diamond with point defects or other material that, when excited by the pump light 113 and the appropriate frequency from RF scanner, either absorbs or amplifies the probe light 119 and subsequently changes the intensity of the output light from the optical resonator 316. In some embodiments, the layer comprising the first material is disposed inside of the optical resonator 316 between two reflecting and/or scattering elements that define the resonator cavity.

Proceeding to block 910, method 900 fabricates the magnetometer by disposing a detector on a fifth layer of the enclosure. For example, the detector can be a photodiode that is coupled to the top 510 of the interior 406 of the enclosure, or can be on another layer. The detector is configured to detect the output light from the optical resonator 316, convert the optical signal to a corresponding electrical signal, and provide the electrical signal to processing and/or control circuitry for analysis of the magnetic field characteristics. Such electrical signals can be provided through electrical leads integrated in the enclosure to a processing system disposed on the exterior 404 or integrated on the enclosure.

Method 900 fabricates the magnetometer at block 912 by disposing temperature control circuitry (TCC) in the enclosure. This enables the thermal environment of each layer of the VCL 302 to be independently and selectively regulated. For example, one or more TECs and/or thermistors can be disposed in one or more layers in the interior 406, and connected to each layer through electrical leads. A processing system with control circuitry can send control signals to the TCC in response to the thermal environment of a layer (or multiple layers) being outside of a threshold or tolerance interval. As a result, each layer is not only thermally insulated from the exterior 404 of the enclosure 400 but also thermally insulated from other layers. The thermal control on a layer-by-layer basis improves the functionality and integrity of the VCL 302 and the magnetometer used for vehicle navigation.

The interior 406 of the enclosure is then hermetically sealed as a way to thermally insulate the VCL 302 as well as its individual components from the exterior environment.

Although method 900 describes each VCL 302 component as being disposed on different enumerated layers ("first", "second", "third", etc.), one or more of the VCL 302 components can be disposed on the same layer. For example, the pump light source and the probe light source can be disposed on the same layer. Also, the ordering of the components can be reversed or switched, depending on the VCL 302 that is used. Accordingly, reference to enumerated layers should not be understood as limited to a specific sequence or arrangement of layers.

The methods and techniques described herein may be implemented at least in part in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as erasable programmable read-only memory (EPROM), electrically-erasable programmable read-only memory (EEPROM), and flash memory devices; magnetic disks such as internal hard disks and removable disks; magneto-optical disks; and the like. Any of the foregoing may be supplemented by, or incorporated in, specially-designed application specific integrated circuits (ASICs).

EXAMPLE EMBODIMENTS

Example 1 includes a system comprising: an enclosure comprising an exterior and an interior, wherein the interior comprises a plurality of protrusions, each protrusion configured to support at least one component of a vertical cavity laser (VCL) to define a layer, wherein each respective layer of a plurality of layers is stacked vertically with respect to another respective layer, wherein the plurality of layers is thermally insulated from the exterior of the enclosure, wherein one of the plurality of layers is thermally insulated with respect to another of the plurality of layers, wherein a pump light source is disposed on a first layer of the plurality of layers, the pump light source configured to generate light at a first frequency, wherein a radio frequency (RF) scanner is disposed on a second layer of the plurality of layers, the RF scanner configured to emit RF radiation at a range of frequencies to a first material, wherein a gain medium is disposed on a third layer of the plurality of layers, the gain medium configured to generate probe light at a second frequency in the VCL, wherein the first material is disposed on a fourth layer of the plurality of layers, the first material configured to absorb or intensify the light at the second frequency when excited by light at the first frequency, wherein an optical resonator comprising a plurality of reflecting elements is disposed on at least one layer of the plurality of layers, the optical resonator configured to generate output light, a detector coupled to the interior of the enclosure, the detector configured to detect the output light, and temperature control circuitry electrically coupled to the plurality of layers, wherein the temperature control circuitry is configured to adjust a temperature of one or more layers.

Example 2 includes the system of Example 1, comprising a controller coupled to the temperature control circuitry, wherein the controller is configured to send control signals activating the temperature control circuitry in response to a change of the temperature of the one or more layers.

Example 3 includes the system of any of Examples 1-2, comprising a plurality of electrical leads on each layer of the plurality of layers, wherein the plurality of electrical leads is configured to communicate electrical signals from the temperature control circuitry to a respective component of the VCL disposed on the respective layer.

Example 4 includes the system of any of Examples 1-3, wherein each of the at least one component of the VCL is disposed on a respective platform substrate that is coupled to a respective protrusion defining the respective layer.

Example 5 includes the system of any of Examples 1-4, wherein the temperature control circuitry is disposed in the interior of the enclosure.

Example 6 includes the system of any of Examples 1-5, comprising at least one processor coupled to the detector, wherein the at least one processor is configured to determine one or more characteristics of an external magnetic field based on the detected output light.

Example 7 includes the system of any of Examples 1-6, wherein the interior of the enclosure is hermetically-sealed.

Example 8 includes the system of any of Examples 1-7, wherein the RF scanner is disposed above the pump light source, wherein the first material is disposed above the RF scanner, wherein the detector is disposed above the first material.

Example 9 includes an enclosure configured to house a vertical cavity laser (VCL), comprising: an exterior; and an interior, wherein the interior comprises a plurality of protrusions, each protrusion configured to support at least one component of the VCL to define a layer, wherein each respective layer of a plurality of layers is stacked vertically with respect to another respective layer, wherein the plurality of layers is thermally insulated from the exterior of the enclosure, wherein one of the plurality of layers is thermally insulated with respect to another of the plurality of layers, wherein a pump light source is disposed on a first layer of the plurality of layers, the pump light source configured to generate light at a first frequency, wherein a radio frequency (RF) scanner is disposed on a second layer of the plurality of layers, the RF scanner configured to emit RF radiation at a range of frequencies to a first material, wherein a gain medium is disposed on a third layer of the plurality of layers, the gain medium configured to generate probe light at a second frequency in the VCL, wherein the first material is disposed on a fourth layer of the plurality of layers, the first material configured to absorb or intensify the light at the second frequency when excited by light at the first frequency, wherein an optical resonator comprising a plurality of reflecting elements is disposed on at least one layer of the plurality of layers, the optical resonator configured to generate output light, a detector coupled to the interior of the enclosure, the detector configured to detect the output light, and temperature control circuitry electrically coupled to the plurality of layers, wherein the temperature control circuitry is configured to adjust a temperature of one or more layers.

Example 10 includes the enclosure of Example 9, comprising a controller coupled to the temperature control circuitry, wherein the controller is configured to send control signals activating the temperature control circuitry in response to a change of the temperature of the one or more layers.

Example 11 includes the enclosure of any of Examples 9-10, comprising a plurality of electrical leads on each layer of the plurality of layers, wherein the plurality of electrical leads is configured to communicate electrical signals from the temperature control circuitry to a respective component of the VCL disposed on the respective layer.

Example 12 includes the enclosure of any of Examples 9-11, comprising a plurality of platform substrates respectively coupled to a respective protrusion, wherein each respective platform substrate supports a respective component of the VCL.

Example 13 includes the enclosure of any of Examples 9-12, comprising at least one processor coupled to the detector, wherein the at least one processor is configured to determine one or more characteristics of an external magnetic field based on the detected output light.

Example 14 includes the enclosure of any of Examples 9-13, wherein the interior of the enclosure is hermetically-sealed.

Example 15 includes the enclosure of any of Examples 9-14, wherein the temperature control circuitry comprises a thermoelectric cooler and/or a thermistor.

Example 16 includes a method for fabricating a magnetometer, wherein the magnetometer comprises an enclosure comprising an exterior and an interior, wherein the interior comprises a plurality of protrusions, each protrusion configured to support at least one component of a vertical cavity laser (VCL) to define a layer, the method comprising: disposing a pump light source on a first layer of the plurality of layers, the pump light source configured to generate light at a first frequency, disposing a radio frequency (RF) scanner on a second layer of the plurality of layers, the RF scanner configured to emit RF radiation at a range of frequencies to a first material, wherein a gain medium is disposed on a third layer of the plurality of layers, the gain medium configured to generate probe light at a second frequency in the vertical cavity laser, disposing the first material on a fourth layer of the plurality of layers, the first material configured to absorb or intensify the light at the second frequency when excited by light at the first frequency, disposing an optical resonator comprising a plurality of reflecting elements on at least one layer of the plurality of layers, the optical resonator configured to generate output light, electrically coupling a detector to the interior of the enclosure, the detector configured to detect the output light, and electrically coupling temperature control circuitry to the plurality of layers, wherein the temperature control circuitry is configured to adjust a temperature of one or more layers, wherein each respective layer of a plurality of layers is stacked vertically with respect to another respective layer, wherein the plurality of layers is thermally insulated from the exterior of the enclosure, wherein one of the plurality of layers is thermally insulated with respect to another of the plurality of layers.

Example 17 includes the method of Example 16, comprising hermetically-sealing the interior of the enclosure.

Example 18 includes the method of any of Examples 16-17, comprising activating the temperature control circuitry in response to a change of the temperature of the one or more layers.

Example 19 includes the method of any of Examples 16-18, comprising communicating, by electrical leads coupled to each of the plurality of layers, electrical signals from the temperature control circuitry to a respective component of the VCL disposed on the respective layer.

Example 20 includes the method of any of Examples 16-19, comprising determining, by at least one processor coupled to the detector, one or more characteristics of an external magnetic field based on the detected output light.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this disclosure be limited only by the claims and the equivalents thereof.

What is claimed is:

1. A system comprising:
an enclosure comprising an exterior and an interior, wherein the interior comprises a plurality of protrusions, each protrusion configured to support at least one component of a vertical cavity laser (VCL) to define a layer, wherein each respective layer of a plurality of layers is stacked vertically with respect to another respective layer, wherein the plurality of layers is thermally insulated from the exterior of the enclosure, wherein one of the plurality of layers is thermally insulated with respect to another of the plurality of layers,
wherein a pump light source is disposed on a first layer of the plurality of layers, the pump light source configured to generate light at a first frequency,
wherein a radio frequency (RF) scanner is disposed on a second layer of the plurality of layers, the RF scanner configured to emit RF radiation at a range of frequencies to a first material,
wherein a gain medium is disposed on a third layer of the plurality of layers, the gain medium configured to generate probe light at a second frequency in the VCL,
wherein the first material is disposed on a fourth layer of the plurality of layers, the first material configured to absorb or intensify the light at the second frequency when excited by light at the first frequency,
wherein an optical resonator comprising a plurality of reflecting elements is disposed on at least one layer of the plurality of layers, the optical resonator configured to generate output light,
a detector coupled to the interior of the enclosure, the detector configured to detect the output light, and
temperature control circuitry electrically coupled to the plurality of layers, wherein the temperature control circuitry is configured to adjust a temperature of one or more layers.

2. The system of claim 1, comprising a controller coupled to the temperature control circuitry, wherein the controller is configured to send control signals activating the temperature control circuitry in response to a change of the temperature of the one or more layers.

3. The system of claim 1, comprising a plurality of electrical leads on each layer of the plurality of layers, wherein the plurality of electrical leads is configured to communicate electrical signals from the temperature control circuitry to a respective component of the VCL disposed on the respective layer.

4. The system of claim 1, wherein each of the at least one component of the VCL is disposed on a respective platform substrate that is coupled to a respective protrusion defining the respective layer.

5. The system of claim 1, wherein the temperature control circuitry is disposed in the interior of the enclosure.

6. The system of claim 1, comprising at least one processor coupled to the detector, wherein the at least one processor is configured to determine one or more characteristics of an external magnetic field based on the detected output light.

7. The system of claim 1, wherein the interior of the enclosure is hermetically-sealed.

8. The system of claim 1, wherein the RF scanner is disposed above the pump light source, wherein the first material is disposed above the RF scanner, wherein the detector is disposed above the first material.

9. An enclosure configured to house a vertical cavity laser (VCL), comprising:
an exterior; and
an interior, wherein the interior comprises a plurality of protrusions, each protrusion configured to support at least one component of the VCL to define a layer, wherein each respective layer of a plurality of layers is stacked vertically with respect to another respective layer, wherein the plurality of layers is thermally insulated from the exterior of the enclosure, wherein one of the plurality of layers is thermally insulated with respect to another of the plurality of layers,
wherein a pump light source is disposed on a first layer of the plurality of layers, the pump light source configured to generate light at a first frequency,
wherein a radio frequency (RF) scanner is disposed on a second layer of the plurality of layers, the RF scanner configured to emit RF radiation at a range of frequencies to a first material,
wherein a gain medium is disposed on a third layer of the plurality of layers, the gain medium configured to generate probe light at a second frequency in the VCL,
wherein the first material is disposed on a fourth layer of the plurality of layers, the first material configured to absorb or intensify the light at the second frequency when excited by light at the first frequency,
wherein an optical resonator comprising a plurality of reflecting elements is disposed on at least one layer of the plurality of layers, the optical resonator configured to generate output light,
a detector coupled to the interior of the enclosure, the detector configured to detect the output light, and
temperature control circuitry electrically coupled to the plurality of layers, wherein the temperature control circuitry is configured to adjust a temperature of one or more layers.

10. The enclosure of claim 9, comprising a controller coupled to the temperature control circuitry, wherein the controller is configured to send control signals activating the temperature control circuitry in response to a change of the temperature of the one or more layers.

11. The enclosure of claim 9, comprising a plurality of electrical leads on each layer of the plurality of layers, wherein the plurality of electrical leads is configured to communicate electrical signals from the temperature control circuitry to a respective component of the VCL disposed on the respective layer.

12. The enclosure of claim 9, comprising a plurality of platform substrates respectively coupled to a respective protrusion, wherein each respective platform substrate supports a respective component of the VCL.

13. The enclosure of claim 9, comprising at least one processor coupled to the detector, wherein the at least one processor is configured to determine one or more characteristics of an external magnetic field based on the detected output light.

14. The enclosure of claim 9, wherein the interior of the enclosure is hermetically-sealed.

15. The enclosure of claim 9, wherein the temperature control circuitry comprises a thermoelectric cooler and/or a thermistor.

16. A method for fabricating a magnetometer, wherein the magnetometer comprises an enclosure comprising an exterior and an interior, wherein the interior comprises a plurality of protrusions, each protrusion configured to support at least one component of a vertical cavity laser (VCL) to define a layer, the method comprising:

disposing a pump light source on a first layer of the plurality of layers, the pump light source configured to generate light at a first frequency, disposing a radio frequency (RF) scanner on a second layer of the plurality of layers, the RF scanner configured to emit RF radiation at a range of frequencies to a first material, wherein a gain medium is disposed on a third layer of the plurality of layers, the gain medium configured to generate probe light at a second frequency in the vertical cavity laser, disposing the first material on a fourth layer of the plurality of layers, the first material configured to absorb or intensify the light at the second frequency when excited by light at the first frequency, disposing an optical resonator comprising a plurality of reflecting elements on at least one layer of the plurality of layers, the optical resonator configured to generate output light, electrically coupling a detector to the interior of the enclosure, the detector configured to detect the output light, and electrically coupling temperature control circuitry to the plurality of layers, wherein the temperature control circuitry is configured to adjust a temperature of one or more layers, wherein each respective layer of a plurality of layers is stacked vertically with respect to another respective layer, wherein the plurality of layers is thermally insulated from the exterior of the enclosure, wherein one of the plurality of layers is thermally insulated with respect to another of the plurality of layers.

17. The method of claim 16, comprising hermetically-sealing the interior of the enclosure.

18. The method of claim 16, comprising activating the temperature control circuitry in response to a change of the temperature of the one or more layers.

19. The method of claim 16, comprising communicating, by electrical leads coupled to each of the plurality of layers, electrical signals from the temperature control circuitry to a respective component of the VCL disposed on the respective layer.

20. The method of claim 16, comprising determining, by at least one processor coupled to the detector, one or more characteristics of an external magnetic field based on the detected output light.

* * * * *